US010620996B2

(12) United States Patent
Tucker et al.

(10) Patent No.: US 10,620,996 B2
(45) Date of Patent: Apr. 14, 2020

(54) BATCHING ASYNCHRONOUS WEB REQUESTS

(71) Applicant: ServiceNow, Inc., Santa Clara, CA (US)

(72) Inventors: Christopher Tucker, San Diego, CA (US); Kyle Barron-Kraus, San Diego, CA (US)

(73) Assignee: ServiceNow, Inc., Satna Clara, CA (US)

( * ) Notice: Subject to any disclaimer, the term of this patent is extended or adjusted under 35 U.S.C. 154(b) by 244 days.

(21) Appl. No.: 15/497,818

(22) Filed: Apr. 26, 2017

(65) Prior Publication Data

US 2018/0316778 A1    Nov. 1, 2018

(51) Int. Cl.
| | | |
|---|---|---|
| *G06F 9/50* | (2006.01) | |
| *H04L 29/08* | (2006.01) | |
| *H04L 29/06* | (2006.01) | |

(52) U.S. Cl.
CPC .............. *G06F 9/50* (2013.01); *H04L 67/02* (2013.01); *H04L 67/1008* (2013.01); *H04L 67/32* (2013.01); *H04L 67/42* (2013.01); *G06F 2209/541* (2013.01)

(58) Field of Classification Search
CPC ......... H04L 67/02; H04L 67/32; H04L 67/42; G06F 2209/541
See application file for complete search history.

(56) References Cited

U.S. PATENT DOCUMENTS

| | | | | |
|---|---|---|---|---|
| 6,035,324 A | * | 3/2000 | Chang | ..................... H04L 29/06 709/203 |
| 6,070,184 A | * | 5/2000 | Blount | ..................... H04L 29/06 709/200 |
| 6,728,957 B1 | * | 4/2004 | Nakazato | .............. G06F 9/4887 714/E11.195 |
| 7,689,665 B2 | * | 3/2010 | Lipton | ................ G06F 9/44521 709/217 |

(Continued)

OTHER PUBLICATIONS

Wikipedia, Nagle's algorithm, downloaded from https://en.wikipedia.org/wiki/Nagle%27s_algorithm Apr. 21, 2017.

(Continued)

*Primary Examiner* — Lashonda T Jacobs
(74) *Attorney, Agent, or Firm* — Fletcher Yoder PC

(57) ABSTRACT

An example embodiment may involve receiving, by a web server device, a message containing a plurality of asynchronous requests for web content, where the plurality is received from a client device that was provided with a web document from which the web content is at least in part derivable. The example embodiment may also involve sorting, by the web server device, the plurality into an ordering based on respective estimated execution times of the plurality, where the ordering is from least to greatest estimated execution time. The example embodiment may also involve processing, by the web server device, the plurality as ordered until either a predetermined amount of time measured from the beginning of the processing has expired, or all requests of the plurality have been processed. The example embodiment may also involve transmitting, by the web server device and to the client device, results associated with the processed requests.

19 Claims, 9 Drawing Sheets

(56) References Cited

U.S. PATENT DOCUMENTS

| | | | | |
|---|---|---|---|---|
| 8,984,091 | B1* | 3/2015 | Popescu | G06F 16/972 709/217 |
| 9,069,870 | B2* | 6/2015 | Howard | G06F 16/958 |
| 9,231,995 | B2* | 1/2016 | Junnarkar | H04L 67/26 |
| 9,507,761 | B2* | 11/2016 | Tripp | G06F 16/95 |
| 10,084,740 | B2* | 9/2018 | Crowther | H04L 67/32 |
| 10,284,671 | B2* | 5/2019 | Kukreja | H04L 67/2833 |
| 2004/0139433 | A1* | 7/2004 | Blythe | G06F 9/505 718/100 |
| 2005/0086206 | A1* | 4/2005 | Balasubramanian | G06F 16/951 |
| 2007/0162560 | A1* | 7/2007 | Jin | G06Q 10/10 709/217 |
| 2009/0055468 | A1* | 2/2009 | Burckart | G06F 16/00 709/203 |
| 2010/0287553 | A1* | 11/2010 | Schmidt | G06F 9/4818 718/101 |
| 2011/0066676 | A1* | 3/2011 | Kleyzit | G06F 16/9574 709/203 |
| 2011/0145891 | A1* | 6/2011 | Bade | H04L 63/101 726/4 |
| 2011/0173177 | A1* | 7/2011 | Junqueira | G06F 16/951 707/709 |
| 2011/0258630 | A1* | 10/2011 | Fee | G06F 9/4843 718/101 |
| 2011/0302454 | A1* | 12/2011 | Prophete | G06F 11/3688 714/38.1 |
| 2012/0005597 | A1* | 1/2012 | Eberlein | G06F 9/4881 715/751 |
| 2014/0101235 | A1* | 4/2014 | Smedberg | G06F 17/2235 709/203 |
| 2014/0101278 | A1* | 4/2014 | Raman | G06F 9/528 709/213 |
| 2014/0372594 | A1* | 12/2014 | Brinza | H04L 43/08 709/224 |
| 2017/0004020 | A1* | 1/2017 | Chen | G06F 9/541 |
| 2017/0024258 | A1* | 1/2017 | Reid | G06F 9/52 |
| 2017/0153924 | A1* | 6/2017 | Lee | G06F 9/4887 |

OTHER PUBLICATIONS

Client-Side Scripting: Javascript, Chapter 9, Jan. 28, 2013, downloaded from http://www.cs.kent.edu/~svirdi/Ebook/wdp/ch09.pdf Apr. 21, 2017.

* cited by examiner

BATCHING ASYNCHRONOUS WEB REQUESTS

BACKGROUND

Web transactions may involve a web server device transmitting a web document to a client device. The web document may be formatted in accordance with a markup language, such as the HyperText Markup Language (HTML). The web document may define static content and how this static content should be presented on a web page rendered by the client device. In some cases, parts of the web document are not known until the web document is about to be transmitted to the client device or until after this transmission takes place. Therefore, markup languages may also support dynamic content through embedded client-side scripts. These scripts may be delivered to the client device as part of the web document, and may be executed by a web browser on the client device. Such execution may cause the client device to carry out function calls, some of which may result in the client device transmitting requests for and receiving the dynamic content from the web server device or other devices. In this fashion, dynamic content can be combined with the static content of the web document, facilitating more flexibility in the types of information that can be provided to client devices.

A script may identify a function call as being synchronous or asynchronous. Accordingly, a request for dynamic content may be made synchronously or asynchronously. Synchronous requests are typically transmitted and executed in order, meaning that a synchronous request may require that the client device waits until the request is completed before the next request is sent. Asynchronous requests, on the other hand, may be transmitted at any time during or after the rendering of the web document for display as a web page. From a client-side performance and user experience standpoint, asynchronous requests may generally be preferred over synchronous requests because asynchronous requests may allow the web browser to load a web page more quickly and to perform other actions while a request is in the process of being completed. For instance, if one part of a web page is loading as a result of an asynchronous request for web content, a user may interact with and perform other operations related to the web page while the asynchronous request is being completed. On the other hand, the web server device may be subjected to communication and processing overhead for each asynchronous request that it receives.

SUMMARY

The embodiments herein involve the batching of asynchronous requests for web content. In line with the discussion above, a client device may read asynchronous function calls of a web document received from a web server device, and add representations of the asynchronous function calls to a client-side queue. The client device may then generate a "batch" of asynchronous requests corresponding to the queued function calls (e.g., two or more asynchronous requests combined in some fashion into a single message), and send this batch of requests to the web server device.

Upon receipt of the requests, the web server device may estimate how much time it will take for the web server device to execute each request and may sort the requests in order of the estimated execution times. The web server device may then begin processing the requests in the sorted order, starting with the request estimated to take the least amount of time. The web server device may be configured to process these requests until either a predetermined period of time has elapsed, or all the requests have been processed. After one of these conditions is met, the web server device may complete the requests by returning, to the client device, results (e.g., web content) associated with each completed request.

The client device and the web server device may repeat this batching procedure until results have been returned for all of the asynchronous function calls of the web document or until the client-side queue is empty. By enabling the client device and the web server device to handle asynchronous requests in this manner, the communication and processing overhead on the web server device may be reduced. Notably, the number of transactions per web document that the client device carries out with the web server device may be reduced. This, in turn, can improve the performance of the web server device, since the web server device may be able to serve more web documents per unit of time.

Accordingly, a first example embodiment may involve receiving, by a web server device, a message containing a plurality of asynchronous requests for web content. The plurality of asynchronous requests may be received from a client device that was provided with a web document from which the web content is at least in part derivable. The first example embodiment may also involve sorting, by the web server device, the plurality of asynchronous requests into an ordering based on respective estimated execution times of the plurality of asynchronous requests. The ordering may be from least estimated execution time to greatest estimated execution time. The first example embodiment may also involve processing, by the web server device, the plurality of asynchronous requests as ordered. The web server device may process the plurality of asynchronous requests as ordered until either a predetermined amount of time measured from the beginning of the processing has expired, or all of the plurality of asynchronous requests have been processed. The first example embodiment may also involve transmitting, by the web server device and to the client device, results associated with the plurality of asynchronous requests that were processed.

Further, a second example embodiment may involve receiving, by a client device, a web document. The web document may include script content defining a first plurality of asynchronous function calls for web content accessible by way of a web server device and a second plurality of asynchronous function calls for web content accessible by way of the web server device. The client device may receive the web document from the web server device. The second example embodiment may also involve transmitting, by the client device and to the web server device, a first message containing an ordered representation of the first plurality of asynchronous function calls. The second example embodiment may also involve receiving, by the client device and from the web server device, results associated with a first subset of the first plurality of asynchronous function calls that were processed by the web server device. A second subset of the first plurality of asynchronous function calls may not have been processed by the web server device, and the second subset of the first plurality of asynchronous function calls may include one or more asynchronous function calls that appear before one or more of the first plurality of asynchronous function calls in the ordered representation. The second example embodiment may also involve transmitting, by the client device and to the web server device, a second message containing a representation of the second subset of the first plurality of asynchronous function calls and the second plurality of asynchronous function calls.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
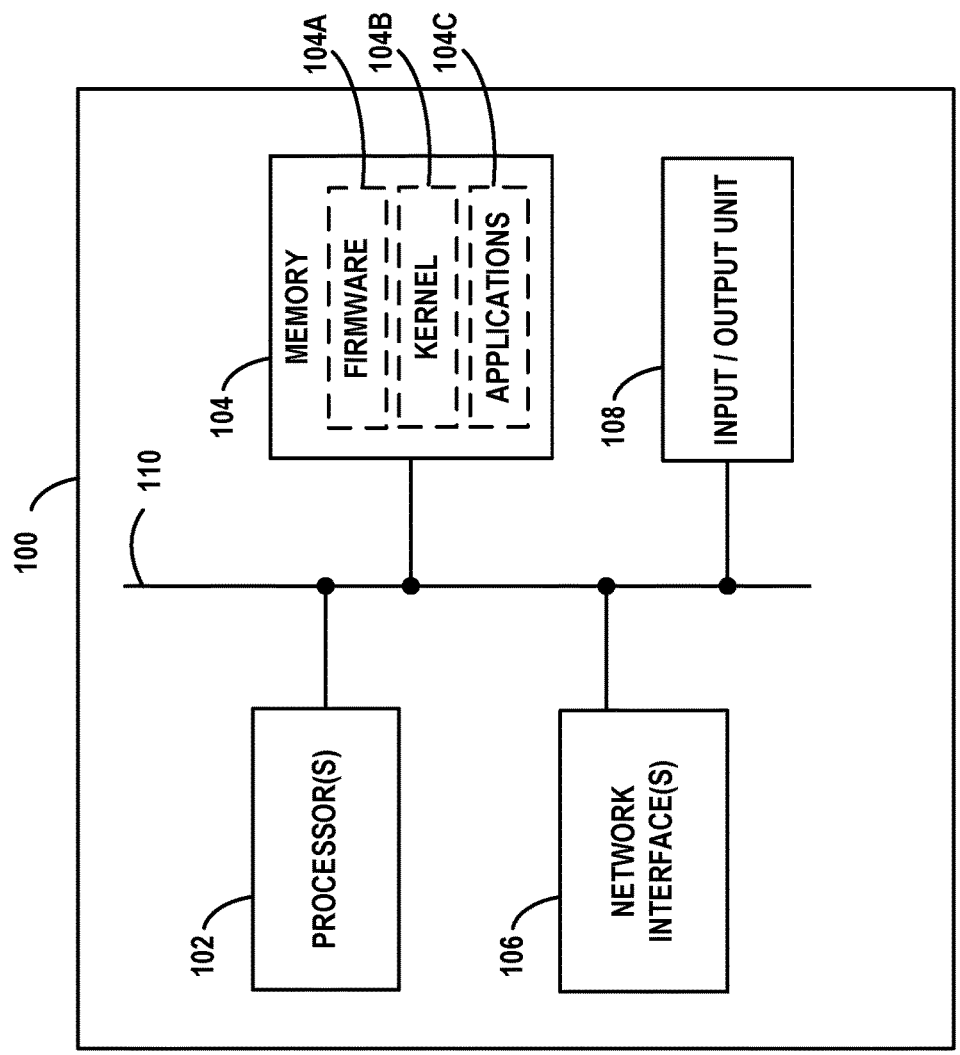
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with got legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, tem-plating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
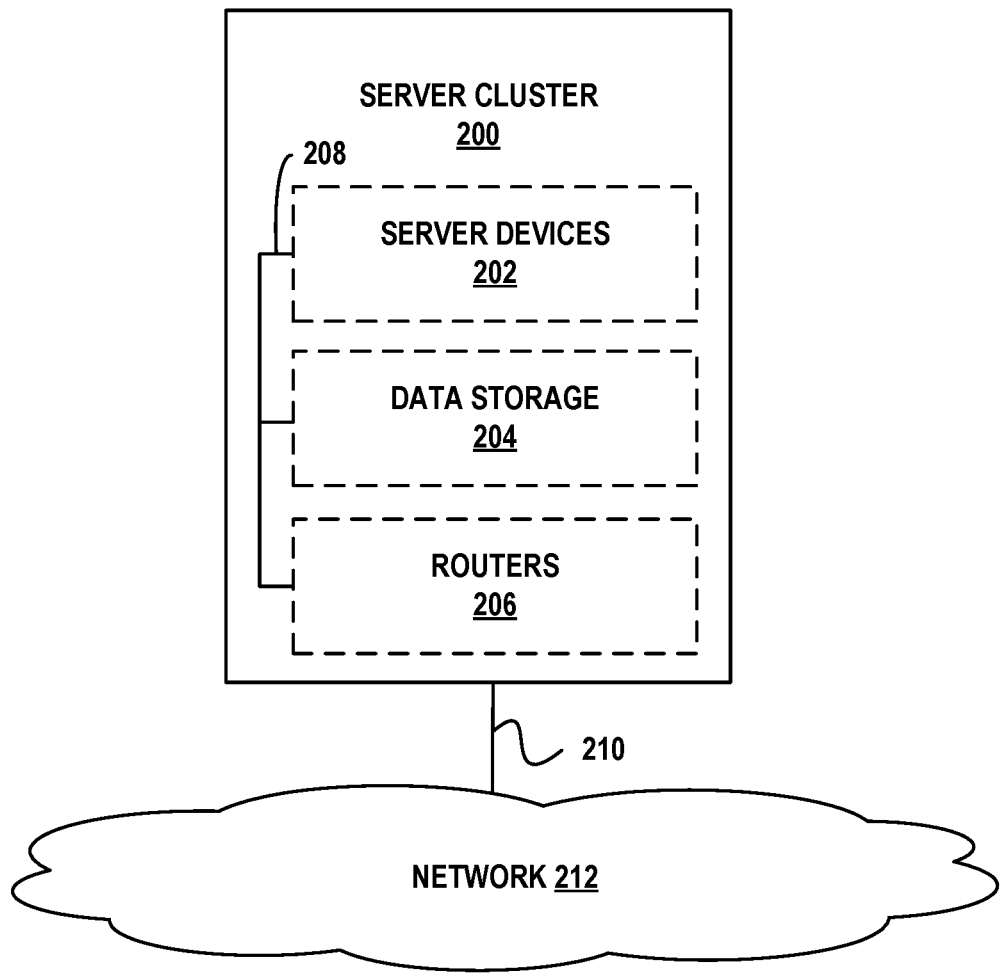
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
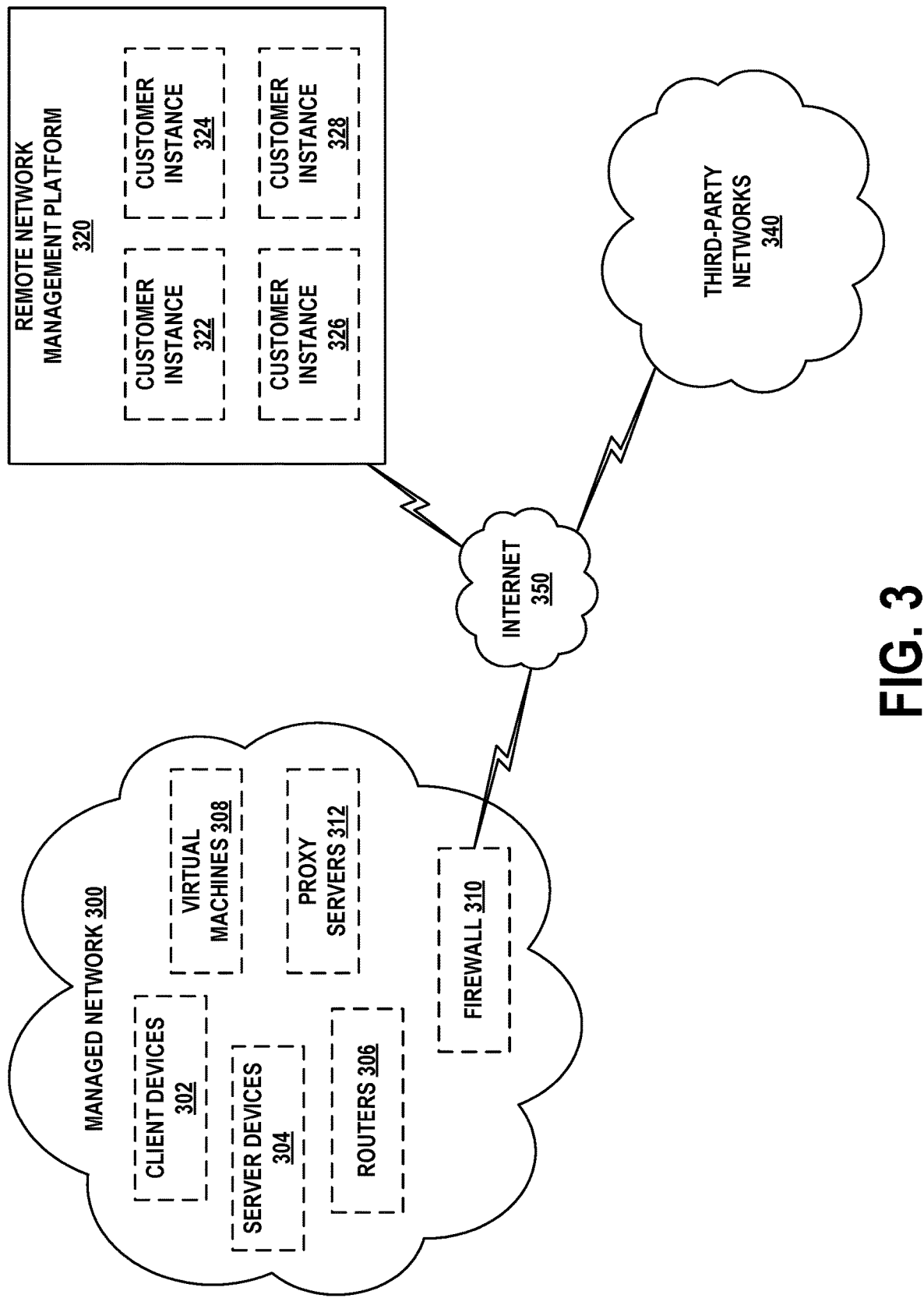
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices and services therein, while allowing authorized communication that is initiated from managed network 300. Firewall 310 may also provide intrusion detection, web filtering, virus scanning, application-layer gateways, and other services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
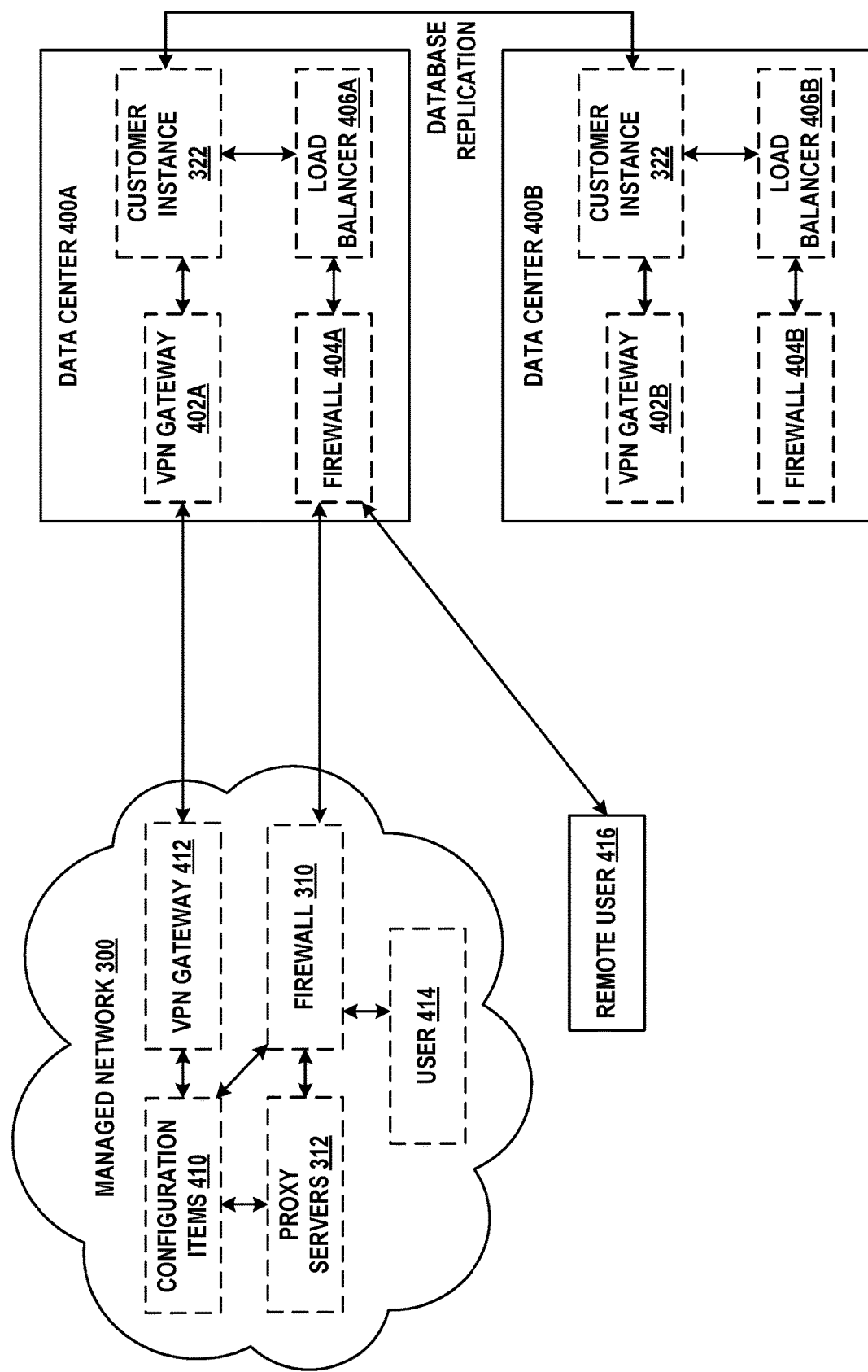
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications, programs, or services executing thereon, as well as relationships between devices and services. Thus, the term "configuration items" may be shorthand for any physical or virtual device or service remotely discoverable or managed by customer instance 322, or relationships between discovered devices and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device and Service Discovery

In order for remote network management platform 320 to administer the devices and services of managed network 300, remote network management platform 320 may first determine what devices are present in managed network 300, the configurations and operational statuses of these devices, and the services provided by the devices, and well as the relationships between discovered devices and services. As noted above, each device, service, and relationship may be referred to as a configuration item. The process of defining configuration items within managed network 300 is referred to as discovery, and may be facilitated at least in part by proxy servers 312.

For purpose of the embodiments herein, a "service" may refer to a process, thread, application, program, server, or any other software that executes on a device. A "service" may also refer to a high-level capability provided by multiple processes, threads, applications, programs, and/or servers on one or more devices working in conjunction with one another. For example, a high-level web service may involve multiple web application server threads executing on one device and accessing information from a database service that executes on another device. The distinction between different types or levels of services may depend upon the context in which they are presented.

Figure 5A:
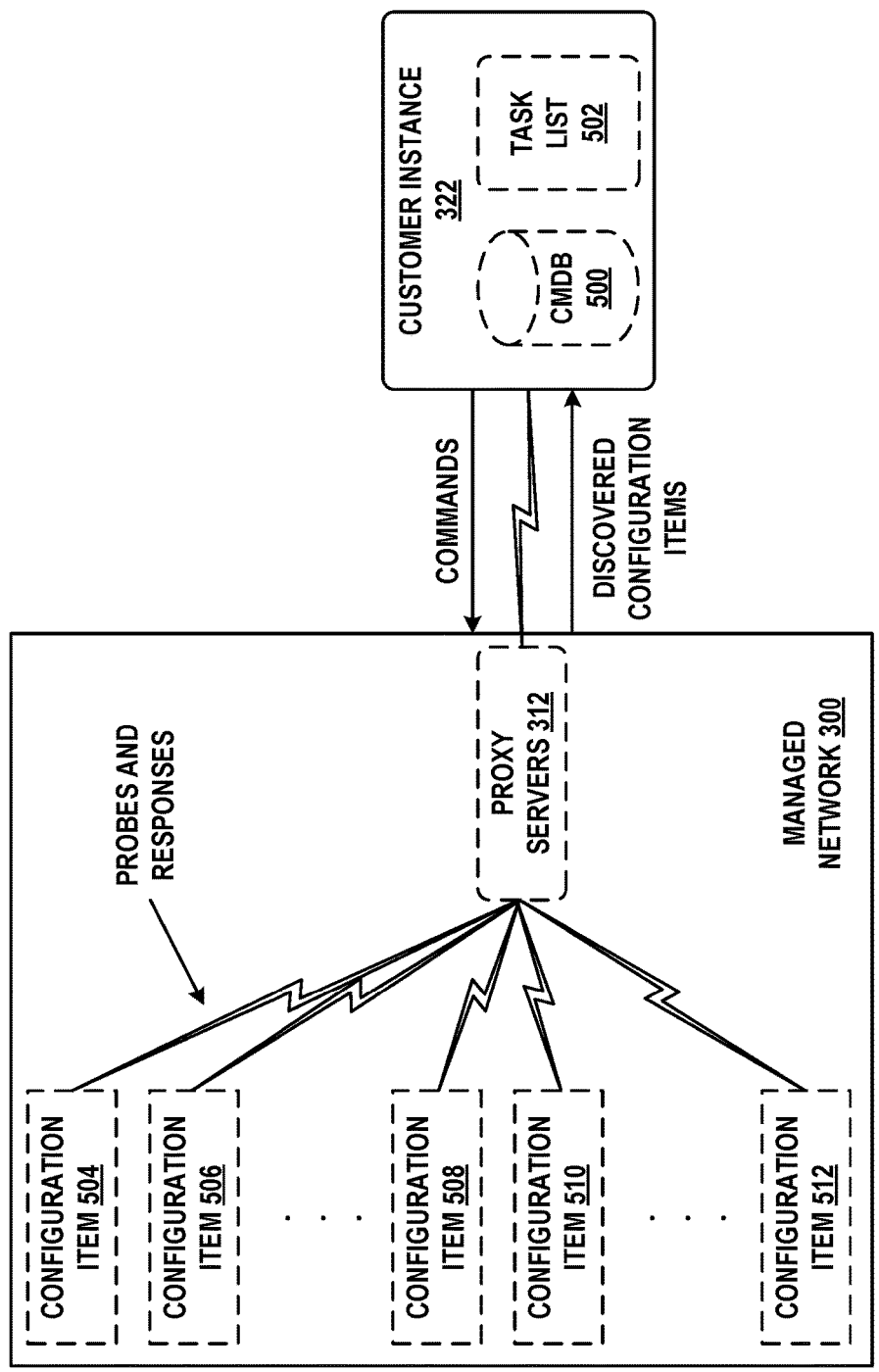
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices and services in managed network 300. These devices and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices and services in managed network 300 as configuration items 504, 506, 508, 510, and 512. As noted above, these configuration items represent a set of physical and/or virtual devices (e.g., client devices, server devices, routers, or virtual machines), services executing thereon (e.g., web servers, email servers, databases, or storage arrays), relationships therebetween, as well as higher-level services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (services), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device and service is available in CMDB 500. For example, after discovery, operating system version, hardware configuration and network configuration details for client devices, server devices, and routers in managed network 300, as well as services executing thereon, may be stored. This collected information may be presented to a user in various ways to allow the user to view the hardware composition and operational status of devices, as well as the characteristics of services.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
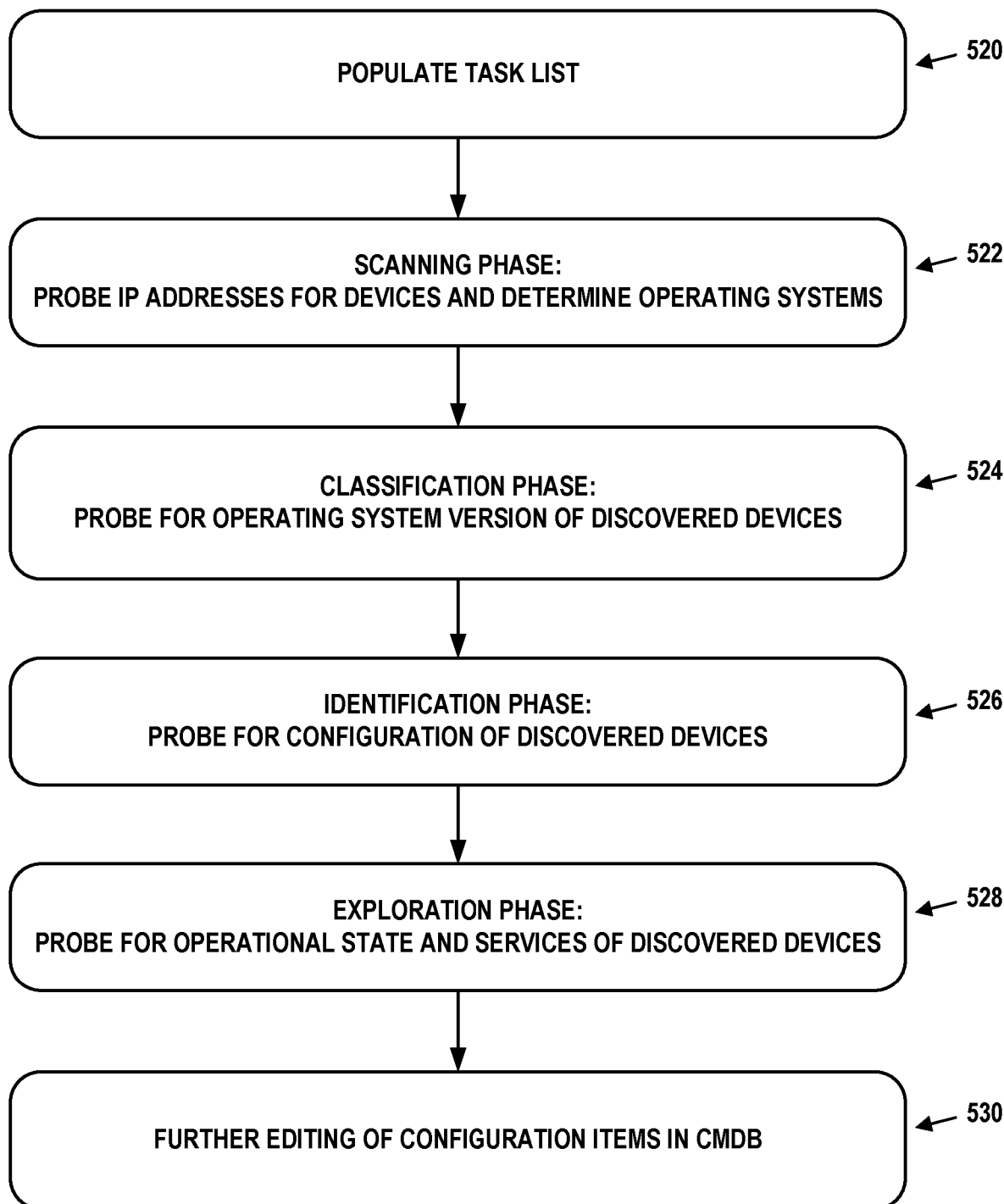
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and services executing on the discovered devices. At block 530, further editing of the configuration items representing the discovered devices and services may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Web Transactions

Web transactions typically involve a client device transmitting a request for web content (e.g., a web page) to a web server device. More particularly, a web browser application executing on the client device may transmit the request in accordance with the HyperText Transport Protocol (HTTP) to a web server application executing on the web server device. The client device may be exemplified by computing device 100, while the web server device may be exemplified by computing device 100 or server cluster 200. However, other possibilities exist.

The request may identify the web content, at least in part, by way of a Uniform Resource Locator (URL). The URL may be a character string that specifies a particular web document available by way of the web server device. In response to receiving the request, the web server device may identify the web document.

The web document may take various forms, one of which is that of an HTML file. This file may contain a combination of content (e.g., text and data), markup (embedded delimiters that specify how the content is to be organized or displayed), and scripts. With respect to the scripts, these may be either server-side or client-side, depending on whether they are intended to be executed by the web server device or the client device.

Server-side scripts may be, for instance, PHP HyperText Preprocessor (PHP) scripts that are executed by the web server device to generate HTML (or other content) that is then embedded in the web document before the web server transmits the web document to the client device. PHP scripts may contain function calls to a database so that parts of the web document can be dynamically generated. The database may reside upon the web server device or on another device accessible to the web server device.

Client-side scripts, on the other hand, may be snippets of JavaScript code that are executed by the client device after the client device receives the web document. Depending on their purpose, these scripts may be executed before or after the web document is rendered by the client device into a web page. In some cases, client-side scripts may be executed after the rendering of a web page in order to make the web page more dynamic. These scripts may respond to user-based events, such mouse-click or mouse-over events to assist with page navigation or to display additional information on the web page. Client-side scripting has led to the concept of a "single-page application," in which a web document contains enough client-side functionality to effectively behave like an application.

While client-side scripting was initially intended to distribute processing between client devices and web server devices such that the burden on web server devices is reduced, new ways of using client-side scripts can instead cause the server-side processing burden to be increased. In particular, Asynchronous JavaScript and XML (AJAX) technologies allow client-side scripts to make dynamic requests to the web server device.

As an example, the XMLHttpRequest (XHR) application programming interface (API) is supported by most web browsers and web servers. XHR allows client-side scripts to dynamically request content from web server devices so that rendered web pages can be modified. In some cases, a web document may contain a number of client-side scripts that, in combination, include a dozen or more XHR function calls. Each of these function calls may involve a separate transaction between the client device and the web server device. Given that a large number of XHR function calls can exist per web document, the number of discrete requests that a web server device is subjected to per web document can dramatically increase the processing burden on the web server device.

While the discussion of web transactions herein are generally focused on a client-server model in which a web server device provides a web document for rendering and display on a display unit (e.g., a screen) of a client device, other models are possible. The embodiments herein may also be able to improve transactions using web-based protocols even if the client device does not render the resulting web content for display. Thus, these embodiments may be applicable to machine-to-machine communications, as well as other types of transactions.

The aPaaS system described in FIGS. 3-5A may be a particularly suitable candidate for deploying these embodiments because it may make heavy use of web transactions with client-side scripting. Particularly, one or more server devices disposed within customer instance 322 may provide web-based interfaces that allow users in managed network 300 and elsewhere to view the configuration and operational conditions of managed network 300. From this interface, users may be able to trigger discovery procedures, view network and device status, and carry out higher-level procedures (e.g., managing IT, HR, and finance operations). Nonetheless, the embodiments herein may be used to enhance any web transaction with client-side scripts that make function calls to the web server device.

VI. Example Batching Procedure for Asynchronous Requests for Web Content

As noted above, asynchronous technologies may be preferred in some instances over synchronous technologies, as asynchronous requests may allow the web browser to load a web page more quickly and to perform other actions while a request is in the process of being completed. However, the web server device may be subjected to communication and processing overhead for each asynchronous request that it receives. For instance, in order to obtain all the necessary web content to fully render a web document for display, the client device and the web server device may undertake numerous transactions.

To help reduce communication and processing overhead as well as the number of client-server transactions per web document, a procedure for batching asynchronous requests for web content may be implemented. Such a procedure can thus improve the performance of the web server device and the client-server model as a whole.

Figure 6:
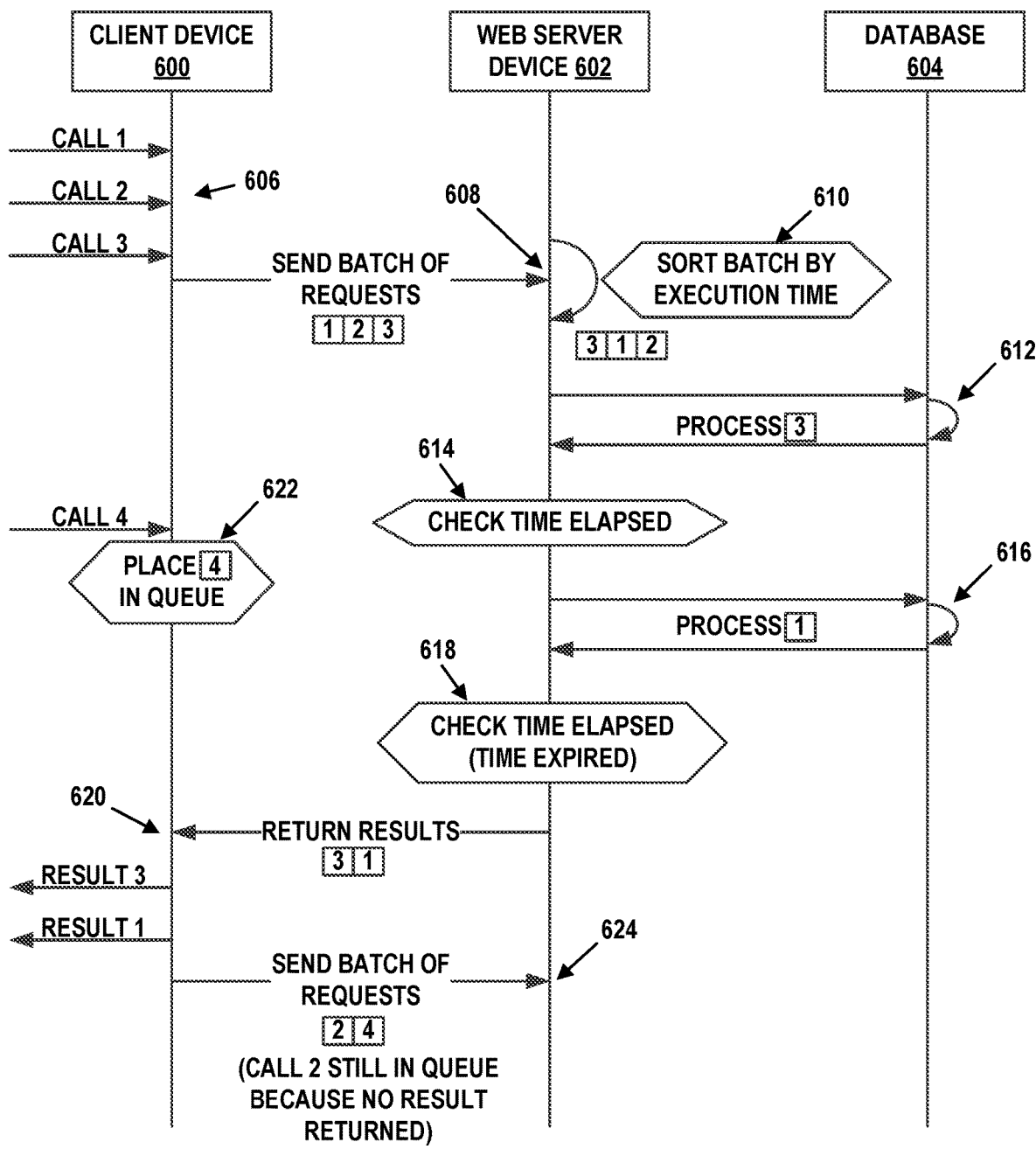
FIG. 6 is a message flow diagram, in accordance with example embodiments.

FIG. 6 illustrates operations of an example batching procedure in the form of a message flow diagram. As shown, FIG. 6 illustrates various client-server transactions between a client device 600 and a web server device 602. Some of the transactions shown in FIG. 6 may involve a database device 604 as well.

The operations described herein relating to batching asynchronous requests can be implemented in the context of other models for web transactions. Furthermore, other example batching procedures are possible, perhaps including additional, less, or different operations than those illustrated in FIG. 6.

In accordance with the operations of FIG. 6, a client device 600 may receive a web document from the web server device 602 (not explicitly shown in FIG. 6). The web document may contain a number of asynchronous function calls, such as AJAX (e.g., XHR) function calls, that allow the client device 600 to make dynamic requests to the web server device 602. For example, a web document may contain four asynchronous function calls in total: Call 1, Call 2, Call 3, and Call 4. After receiving the web document, the client device 600 may read the function calls by scanning the web document to identify the function calls therein. In some embodiments, "scanning" may refer to identifying relevant function calls during execution of the script in which they are contained.

The function calls that the client device 600 may read may be of a particular type, and the client device 600 may attempt to identify the type of each function call it reads. A particular type of function call may include a family or set of related function calls that all involve transmitting asynchronous requests to the web server device 602. To determine what type of function call is being read, the client device 600 may look to the name of the function call, the general format of the function call (which could be defined by a regular expression, for instance), and/or the form or content of the function call's parameters.

In any event, for each function call that the client device 600 reads, the client device 600 may add a representation of the function call to a client-side queue stored in memory accessible by the client device 600. For example, at step 606, the client device 600 reads three function calls (Call 1, Call 2, and Call 3), and stores a representation of each function call in the client-side queue. In some embodiments, a function call representation may remain in the client-side queue until the client device 600 has received a result for the function call.

In some embodiments, the client device 600 may not add a function call representation to the client-side queue until the client device 600 has determined that the corresponding function call is eligible for batching. In order to determine whether the function call is eligible for batching, the client device 600 may consider various factors. For example, the client device 600 may maintain or otherwise have access to a whitelist and/or blacklist of function call types, and may use that whitelist and/or blacklist to determine whether the current function call type is a whitelisted or blacklisted function call type. Accordingly, the client device 600 would batch whitelisted function call types, and would not batch blacklisted function call types.

As another example, the client device 600 may maintain or otherwise have access to a whitelist and/or blacklist of endpoints, and may use that whitelist and/or blacklist to determine whether the function call involves an attempt to access the whitelisted or blacklisted endpoint. In either list, an endpoint may be identified by a URL, IP address, or a domain name to which the endpoint corresponds, for instance. Accordingly, the client device 600 would batch function calls with whitelisted endpoints, and would not batch function calls with blacklisted endpoints.

As yet another example, the web document may include code that indicates to the client device 600 that the function call is not eligible for batching.

Further, as another example, the client device 600 may be pre-configured with a limit on how many function call representations can be in the client-side queue at once, and thus the client device 600 may determine that a function call is ineligible for batching if the client-side queue is at the pre-configured limit.

Still further, as another example, the client device 600 may determine that a function call (more particularly, all function calls) are ineligible for batching if the client device 600 determines that batching has been disabled for the web document. Batching may be disabled for the web document for various reasons. For instance, typically once a web page has been loaded in its entirety, subsequent function calls may occur one at a time (e.g., one function call representation in the client-side queue at a time) or otherwise less often than when a web page is being loaded. Therefore, if batching is enabled even after a web page has been loaded in its entirety, there may be a resulting undesirable delay in the execution of a subsequent function call, since the client device 600 would wait for multiple function call representations to be placed into the client-side queue before transmitting the requests in a batch. Accordingly, once a web page has been loaded in its entirety, the client device 600 may disable batching so that the client device 600 will not delay in executing function calls.

Batching can be disabled or enabled in various ways. In some embodiments, the client device 600 (or other computing device that is communicatively linked to the client device 600) may be configured to provide global settings for enabling or disabling batching on a per-customer-instance basis. For example, with respect to FIG. 3, the global settings may be set such that batching is enabled for customer instances 322 and 324, but disabled for customer instances 326 and 328. In other embodiments, the client device 600 may be configured to provide multiple web browsers with global settings for enabling or disabling batching. For instance, using these settings, a customer may enable batching for one web browser, but disable batching for another web browser. Batching could be disabled or enabled in other ways as well.

The client device 600 may continue to read the function calls and add representations of them in the client-side queue until the client device 600 detects that a trigger event has occurred. In response to detecting the trigger event, the client device 600 may transmit, to the web server device 602, a message including asynchronous requests for each function call representation that is currently present in the client-side queue at the time the client device 600 detects the trigger event.

For example, assume that, in the scenario illustrated in FIG. 6, representations of Calls 1, 2, and 3 are in the client-side queue when client device 600 detects the trigger event. Thus, at step 608, client device 600 transmits, to the web server device 602, a batch of three asynchronous requests (Request 1, Request 2, and Request 3). As noted above, a given "batch" of asynchronous requests may include two or more asynchronous requests combined in some fashion into the form of a single message including data representative of the requests. A batch could take other forms as well.

The trigger event may take various forms. For example, the act of detecting the trigger event may occur when the client device 600 detects that a predetermined time period has expired. The predetermined time period may begin once the client device 600 begins receiving the web document, or may begin at another point in time, such as once the client device 600 adds the first function call representation to the client-side queue, once the client device 600 has received results associated with a previous batch of requests, once the web document has been received in its entirety, or before the client device 600 begins reading the function calls. In some embodiments, the predetermined amount of time may have a value in a range of 30 milliseconds (ms) to 60 ms. The range may be determined based on various factors, such as the estimated execution time of a typical request, an estimated amount of time that it will take to load the entire web page, and/or a round-trip time between the client device 600 and the web server device 602.

Each of these factors may be measured in various ways. For example, the web server device 602 may determine the estimated execution time of a typical request to be an average of the execution times of past requests. To facilitate this, the web server device 602 may maintain a history of execution times of past requests, as described in more detail below. As another example, the web server device 602 may determine the estimated amount of time that it will take to load the entire web page based on a history of loading times for past web pages, or perhaps based on a size of the current web document. As yet another example, the web server device 602 (or client device 600) may determine the round-trip time by transmitting a ping message or other type of message to the client device 600 (or web server device 602), and measuring the time it takes for a response to be received. Other techniques for measuring these factors are possible as well.

As another example, the act of detecting the trigger event may occur when the client device 600 detects that a number of function calls that the client device 600 has read meets or exceeds a predetermined threshold. For instance, the predetermined threshold may be three function calls, and thus the client device 600 may transmit, to the web server device 602, a batch of three asynchronous requests in response to the client device 600 detecting that the client device 600 has read three function calls.

As other examples, the act of detecting the trigger event may occur when the client device 600 detects that the web page has been loaded in its entirety, or when the client device 600 detects that it has received results associated with a previous batch of requests. Other examples are possible as well.

In response to receiving the batch of asynchronous requests from the client device 600, the web server device 602 may sort the requests in order of their estimated execution times. For instance, in some embodiments, the web server device 602 may sort the requests in order from the least estimated execution time to the greatest estimated execution time. In other embodiments, the web server device 602 may sort the requests in a different order.

An execution time for a given request may begin when the web server device 602 begins processing the request, and may end when the web server device 602 obtains a result associated with the request. Alternatively, an execution time may begin when the web server device 602 begins processing the request, and may end when the web server device 602 transmits, to the client device 600, the result associated with the request. Other possible starting and ending points for execution times are possible as well.

To help sort the requests, the web server device 602 may record and maintain, in memory accessible by the web server device 602, execution times for past asynchronous requests that the web server device 602 has processed, and may use these recorded execution times as a basis for determining the estimated execution times for the batched requests that the web server device 602 has received. More particularly, the web server device 602 may maintain a history of execution times for the different types of past asynchronous requests, and may use this history as a basis for determining the estimated execution times for the batched requests that the web server device 602 has received.

Just as each asynchronous function call has a type, each asynchronous request may have a type as well. In order to help the web server device 602 to determine what type of request it is receiving, the client device 600 may be configured to include, in a message representing the request, an identifier or other data that identifies to the web server device 602 the type of function call to which the request corresponds. Accordingly, the web server device 602 may be configured to determine, from the message, which type of request it has received. For example, the web server device 602 may be pre-configured with a table or other data that maps function call type identifiers to respective request types. As such, using the identifiers, the web server device 602 may refer to the table in order to determine what types of request it has received. Similarly, in the batching procedure, the client device 600 may include a respective identifier for each request in the batch message so that the web server device 602 can determine, from the message, which types of requests are included in the batch.

To illustrate an example of how web server device 602 might maintain a history of execution times per request type, consider a scenario in which there are three types of asynchronous requests—Type 1, Type 2, and Type 3. In this scenario, the web server device 602 may maintain a history including execution times for (i) past asynchronous requests of Type 1, (ii) past asynchronous requests of Type 2, and (iii) past asynchronous requests of Type 3. Consequently, if web server device 602 receives a batch of three asynchronous requests including a Type 1 request, a Type 2 request, and a Type 3 request, the web server device 602 may (i) estimate an execution time for the Type 1 request based on the history of execution times for past Type 1 requests, (ii) estimate an execution time for the Type 2 request based on the history of execution times for past Type 2 requests, and (iii) estimate an execution time for the Type 3 request based on the history of execution times for past Type 3 requests.

In some embodiments, the history of execution times for a given type of request may include an average execution time for that type of request. In these embodiments, the act of the web server device 602 determining an estimated execution time for a request of a given type may involve the web server device 602 using the average execution time for that type of request as the estimated execution time. For example, if the web server device 602 has received a Type 1 request in the batch and the average execution time for past Type 1 requests is 8 ms, the web server device 602 may determine that the estimated execution time for the Type 1 request should be 8 ms.

In some embodiments, the average execution time may be a moving average that is based on a subset of execution times in the history. For instance, the subset of execution times may include the execution times of the most recent three requests (or other predetermined number of requests that the web server device 602 is configured to take into account in determining the moving average). As a more specific example, consider a scenario in which, for a given type of request, the execution times of the three most recent requests, from most recent to least recent, are: 10 ms, 7 ms, and 13 ms. In this scenario, the average execution time for that type of request is 10 ms. But later in this scenario, after the web server device 602 receives and executes another request of the type that takes 15 ms to execute, the execution times of the three most recent requests, from most recent to least recent, are: 15 ms, 10 ms, and 7 ms. Thus, the web server device 602 may update the average execution time for that type of request to be approximately 10.67 ms.

As the web server device 602 continues to process requests over time, the web server device 602 may measure execution times of the requests and update the history accordingly, which may involve updating the average execution time for a type of request, as discussed above.

As noted above, upon receipt of the batch of requests, the web server device 602 may sort the batch of requests in order from the least estimated execution time to the greatest estimated execution time. Referring back to FIG. 6, for instance, the web server device 602 may determine, using one or more of the techniques described above, that the estimated execution time of Request 1 is greater than the estimated execution time of Request 2, but less than the estimated execution time of Request 3. As such, at step 610, the web server device 602 sorts the batch of requests such that Request 3 is first to be processed, followed by Request 1, and then followed by Request 2.

It is possible in practice for latency issues to arise when processing of a batch of asynchronous requests. These issues might be caused by a phenomenon referred to as "head-of-line blocking." Head-of-line blocking might occur when the web server device 602 has a batch of requests to process, but cannot send results for the batch until all requests have been processed—even if one or more of the requests are less important than the rest. For example, the web server device 602 may have a batch of ten requests to process, nine of which have an estimated execution time of 100 ms, and one of which has an estimated execution time of 2 seconds. In addition, the tenth, 2-second request might be relatively unimportant (e.g., low priority) compared to the nine 100-ms requests. Thus, in this scenario, results for the batch of ten requests may not be returned to the client device 100 until all requests have been processed, thereby taking a longer amount of time to return the results for the nine important (e.g., high priority) requests.

This phenomenon may be especially problematic in a scenario where the web server device 602 is configured to process a batch of requests for only a predetermined amount of time, and to then sent results once the predetermined amount of time expires. In the scenario described above, for instance, the predetermined period of time might expire in the middle of (or after) processing the 2-second request, and before processing most, if not all, of the nine important 100-ms requests. Accordingly, in order to mitigate the latency caused by this phenomenon, the web server device 602 in this batching procedure may sort the requests in order from the least estimated execution time to the greatest estimated execution time, so that the web server device 602 processes the fastest requests first.

In some embodiments, the web server device 602 may be configured to sort the requests based on other factors as well. For instance, the web server device 602 may sort a given request based on (i) a predefined priority value corresponding to the request (or corresponding to the type of the request), (ii) an amount of time that the request was stored in the client-side queue, (iii) a payload size of the request, and/or (iv) an estimated payload size of the result of the request. Other factors are possible as well.

Sorting based on each of these factors may have distinct advantages. For example, by sorting based on the payload sizes of the requests, the web server device 602 can prioritize processing of larger-sized inbound requests to reduce network traffic. To illustrate how such sorting might reduce network traffic, consider a scenario in which a batch includes three requests: Request A having a payload size of 500 kilobytes and an estimated execution time of 500 ms, Request B having a payload size of 200 bytes an estimated execution time of 20 ms, and Request C having a payload size of 2 kilobytes and an estimated execution time of 250 ms. In this scenario, if the web server device 602 sorts the requests in order of their estimated execution times from least to greatest (i.e., B, C, A), the web server device 602 might not complete processing of each request, as described in greater detail below, and return only the results of Requests B and C. Thus, the client device 600 may subsequently send Request A again to be processed, thereby creating a total network traffic payload for the requests to be 1002.2 kilobytes. However, if the web server device 602 sorts the requests in order of their payload sizes (i.e., A, B, C), the web server device 602 may still not complete the processing of each request, but would complete Request A, and thus client device 600 would not need to re-send Request A, thereby reducing network traffic for the requests by up to 500 kilobytes. For instance, the web server device 602 may return results for only Request A, and the client device 600 would then send a batch with Requests B and C for a total network traffic payload of 504.4 kilobytes.

As another example, sorting based on the estimated payload sizes of the results of the requests may be useful when there is a slow network connection, and accordingly, the web server device 602 can prioritize processing of smaller-sized results over larger-sized results. This may, in effect, make it appear to a user as though the web page is loading quickly despite the slow network connection. Any one or more of these factors can be used for sorting in addition to, or alternative to, the estimated execution times described above. Further, the web server device 602 may be configured to maintain and/or access data related to any one or more of these factors, so as to help the web server device 602 sort using these factors.

After the web server device 602 has sorted the requests in a particular order, the web server device 602 may then process the requests in that particular order. For instance, the web server device 602 may start with the request estimated to take the least amount of time. As shown in FIG. 6, for example, the web server device 602 may first process Request 3, then Request 1, and then Request 2. When the web server device 602 processes a request and obtains a result, the web server device 602 may store the result in a server-side queue in memory accessible by the web server device 602.

The act of processing a request may take various forms. In some embodiments, the web server device 602 may access a database that resides upon the web server device 602 to obtain a result associated with the request. In other embodiments, the web server device 602 may transmit, to a separate database (e.g., database device 604) accessible to the web server device 602, a message containing the request. In response to receiving the message, the database device 604 may look up the result associated with the request and transmit to the web server device 602 a response message containing the result.

In some embodiments, the web server device 602 may process multiple requests at a time in one or more of the manners discussed above. For example, the web server device 602 may transmit, to the database device 604, a message containing the batch of requests. In response to receiving the message, the database device 604 may look up the results associated with the requests and transmit to the web server device 602 a response message containing the results.

The web server device 602 may process the batch of requests as ordered until the web server device 602 detects that a condition has been met. For instance, in some embodiments, the web server device 602 may process the requests until either a predetermined amount of time has expired, or all of the requests have been processed (i.e., all of the requests in the current batch). When either of these conditions is met, the web server device 602 may responsively stop processing the batch of requests, complete the current request that it is processing, and then transmit, to the client device 600, results associated with the requests from the batch that have been processed up to the point where the web server device 602 detected that one of the conditions was met.

The predetermined amount of time may vary. For example, the predetermined amount of time may have a value in a range of 10 ms to 50 ms. The range may be determined based on various factors, such as a round-trip time between the client device 600 and the web server device 602 (which the web server device 602 or the client device 600 may measure in the manner discussed above, for instance). Further, the predetermined amount of time may be measured from various points in time, such as from the time the web server device 602 begins processing the batch of requests (e.g., when the web server device 602 begins processing the first request as ordered), from the time the web server device 602 receives the batch of requests, or perhaps from a different time.

In order for the web server device 602 to determine whether the predetermined amount of time has expired, the web server device 602 may periodically check whether the predetermined amount of time has expired. For instance, the web server device 602 may check whether the predetermined amount of time has expired each time the web server device 602 has completed processing one request, or perhaps each time the web server device 602 has completed processing two or another predetermined number of requests.

In some embodiments, the web server device 602 may be configured such that, when the predetermined amount of time expires, an interrupt routine will be triggered. This interrupt may in turn cause the web server device 602 to stop processing the batch of requests, complete the current request that it is processing, and then transmit, to the client device 600, results associated with the requests from the batch that have been processed up until the interrupt routine was triggered.

Referring back to FIG. 6, at step 612, the web server device 602 processes Request 3 by transmitting, to database device 604, a message containing the request, then receiving, from the database device 604, a response message containing the result for Request 3 (which the web server device 602 may then store in a server-side queue). At step 614, the web server device 602 checks how much time has elapsed and whether the predetermined amount of time has expired. Further, at step 616, the web server device 602 then processes Request 1 in the same manner as Request 3. Then, at step 618, the web server device 602 determines that the predetermined amount of time has expired and stops processing the requests. At step 620, the web server device transmits to the client device 600 the results for the requests that have been processed thus far (Result 3 for Request 3, and Result 1 for Request 1).

In a scenario where the client device 600 does not receive results for each request in the batch that the client device 600 sent to the web server device 602, the client device 600 may keep, in the client-side queue, a representation of the function call associated with the remaining request. By way of example, in the scenario illustrated in FIG. 6, the client device 600 would keep a representation of Call 2 in the client-side queue because the web server device 602 did not provide a result for Request 2, and returned results for only Requests 1 and 3.

At some point, either while processing a batch of requests, or after processing the batch of requests, the client device 600 may read other function calls and store representation of the function calls in the client-side queue. For example, at step 622, the client device 600 reads Call 4 and stores a representation of Call 4 in the client-side queue, which occurs while the web server device 602 is processing the batch of requests.

In some embodiments, the client device 600 and the web server device 602 may repeat the batching procedure described above until the client device 600 determines that either results have been returned for all of the function calls of the web document (e.g., the web document is fully rendered by the client device into a web page), or the client-side queue is empty.

Consider, for example, a scenario in which the client device 600 is configured to repeat the batching procedure until the client device 600 determines that the client-side queue is empty. In this scenario, if representations of other function calls remain in the client-side queue after the client device 600 receives results associated to one batch of requests, the client device 600 may initiate the batching procedure again by transmitting, to the web server device 602, a subsequent batch of requests. This subsequent batch may contain any requests that were in the first batch but not processed and/or any requests corresponding to any new function calls that the client device 600 read while the web server device 602 was processing the first batch. For example, at step 624, client device 600 initiates the batching procedure again by transmitting, to the web server device 602, a new batch of requests corresponding to Call 2 (which wasn't processed in the first batch) and Call 4 (which was received after the first batch was sent).

To facilitate one or more of the operations discussed above, the web document may contain various client-side scripts that specify values for the parameters used in the batching procedure, such as values for the predetermined time period or threshold used for detecting a trigger event, or values for the predetermined amount of time used for processing a given batch. These client-side scripts may take the form of a block of JavaScript code in an HTML file.

VII. Example Operations

A. Example Web Server Device Operations

Figure 7A:
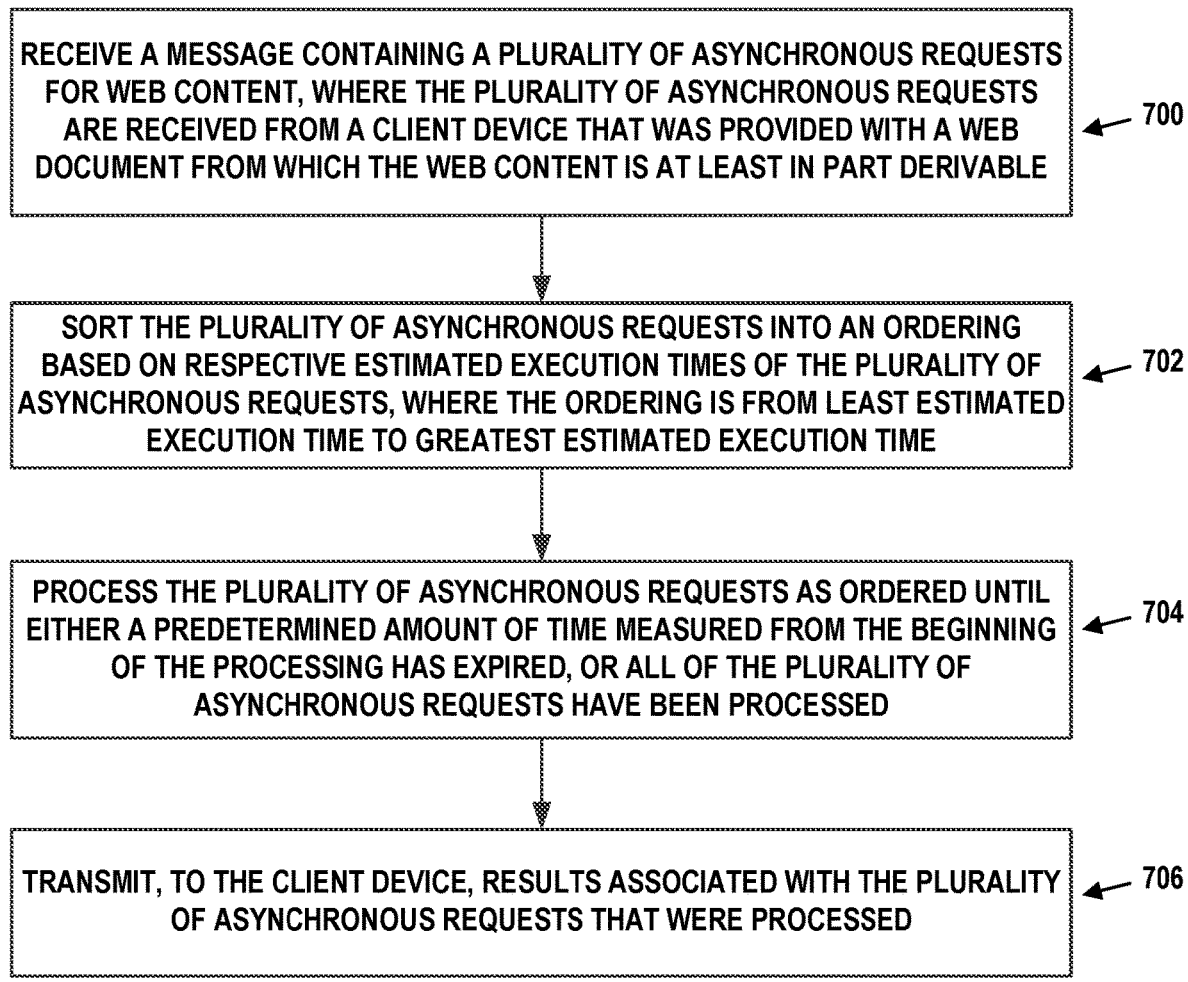
FIG. 7A is a flow chart, in accordance with example embodiments.

FIG. 7A is a flow chart illustrating an example embodiment of the batching procedure discussed above. The process illustrated by FIG. 7A may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7A may be simplified by the removal of any one or more of the features shown therein. Further, these embodiments may be combined with features, aspects, and/or implementations of any of the previous figures or otherwise described herein.

Block 700 may involve receiving a message containing a plurality of asynchronous requests for web content, where the plurality of asynchronous requests is received from a client device that was provided with a web document from which the web content is at least in part derivable.

Block 702 may involve sorting the plurality of asynchronous requests into an ordering based on respective estimated execution times of the plurality of asynchronous requests, where the ordering is from least estimated execution time to greatest estimated execution time.

Block 704 may involve processing the plurality of asynchronous requests as ordered until either a predetermined amount of time measured from the beginning of the processing has expired, or all of the plurality of asynchronous requests have been processed.

Block 706 may involve transmitting, to the client device, results associated with the plurality of asynchronous requests that were processed.

In some embodiments, the operations of FIG. 7A may be performed at least in part by a web server device, such as web server device 602. The web server device may be located in the same network as the client device or in a different network.

In some embodiments, prior to receiving the message containing the plurality of asynchronous requests, the web server device may record, in a memory of the web server device, an execution time for a past asynchronous request, where one or more of the estimated execution times are based on the recorded execution time. In these embodiments, an execution time that is recorded may begin when the web server device began processing the past asynchronous request and end when the web server device obtained a result associated with the past asynchronous request.

In some embodiments, an asynchronous request of the plurality of asynchronous requests may have a type, and the web server device may maintain, in a memory of the web server device, a history of execution times for past asynchronous requests of the type. The web server device may also determine the estimated execution time for the asynchronous request based on the history of execution times for past asynchronous requests of the type.

In some embodiments, the history may include an average execution time for the type of asynchronous request, and the act of determining the estimated execution time for the asynchronous request based on the determined execution time for the type of asynchronous request may involve determining the estimated execution time to be the average execution time for the type of asynchronous request. In such embodiments, the web server device may measure an execution time for the asynchronous request and, based on the measured execution time for the asynchronous request, determine an update to the average execution time for the type of asynchronous request.

In some embodiments, the act of processing the plurality of asynchronous requests as ordered may involve transmitting, to a database device, a message containing the plurality of asynchronous requests as ordered, and then receiving, from the database, a response message containing the results associated with the plurality of asynchronous requests.

In some embodiments, the message may be a first message, and the plurality of asynchronous requests may be a first plurality of asynchronous requests. In such embodiments, the web server device may receive, from the client device, a second message containing a second plurality of asynchronous requests for web content. The second message may further contain any asynchronous requests of the first plurality of asynchronous requests that were not processed by the web server device (or by another device, such as the database device).

B. Example Client Device Operations

Figure 7B:
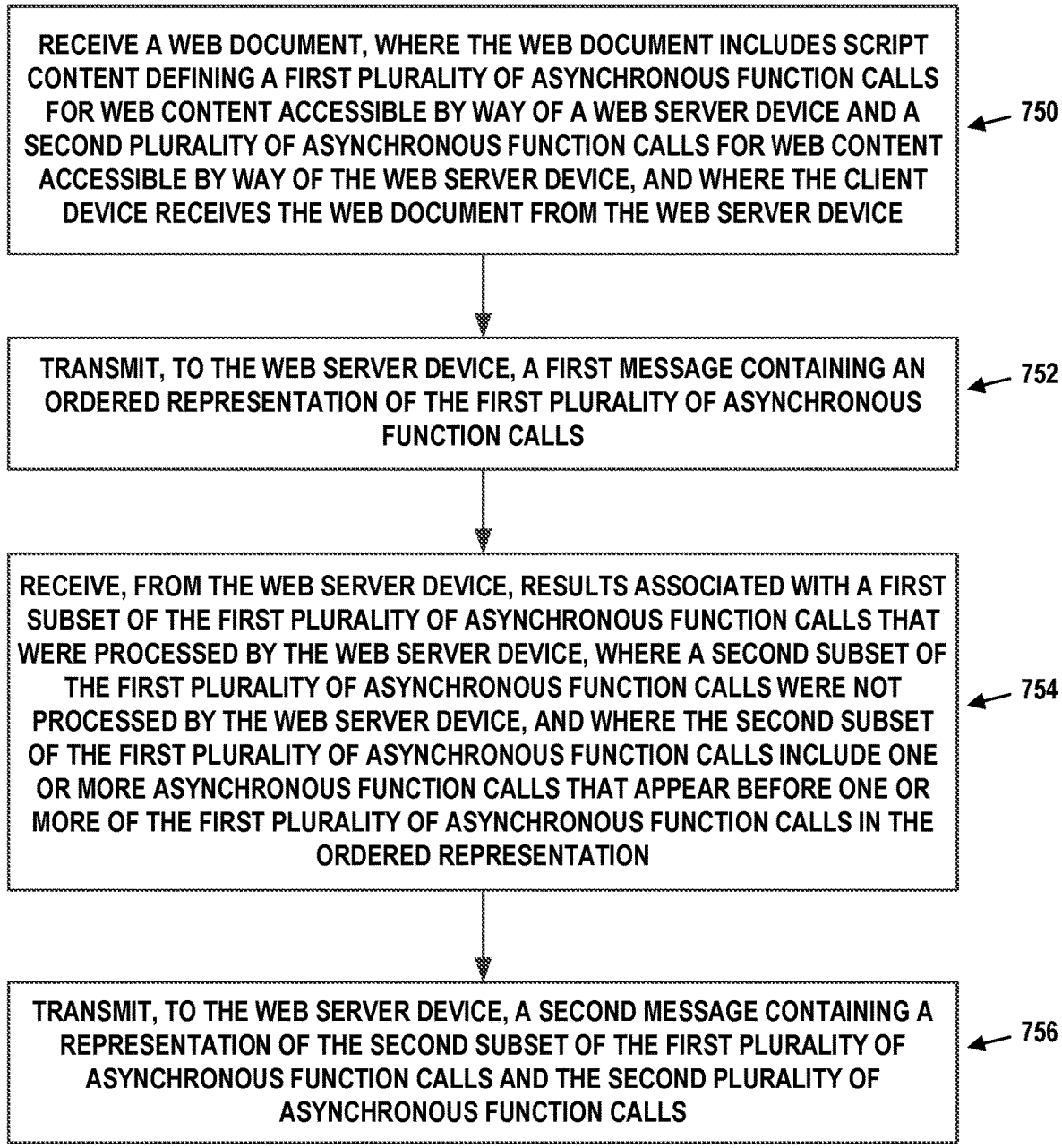
FIG. 7B is a flow chart, in accordance with example embodiments.

FIG. 7B is a flow chart illustrating an example embodiment of the batching procedure discussed above. The process illustrated by FIG. 7B may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7B may be simplified by the removal of any one or more of the features shown therein. Further, these embodiments may be combined with features, aspects, and/or implementations of any of the previous figures or otherwise described herein.

Block 750 may involve receiving a web document, where the web document includes script content defining a first plurality of asynchronous function calls for web content accessible by way of a web server device and a second plurality of asynchronous function calls for web content accessible by way of the web server device, and where the client device receives the web document from the web server device.

Block 752 may involve transmitting, to the web server device, a first message containing an ordered representation of the first plurality of asynchronous function calls.

Block 754 may involve receiving, from the web server device, results associated with a first subset of the first plurality of asynchronous function calls that were processed by the web server device, where a second subset of the first plurality of asynchronous function calls were not processed by the web server device, and where the second subset of the first plurality of asynchronous function calls include one or more asynchronous function calls that appear before one or more of the first plurality of asynchronous function calls in the ordered representation.

Block 756 may involve transmitting, to the web server device, a second message containing a representation of the second subset of the first plurality of asynchronous function calls and the second plurality of asynchronous function calls.

In some embodiments, the operations of FIG. 7B may be performed at least in part by a client device, such as client device 600. As noted above, the client device may be located in the same network as the web server device or in a different network.

In some embodiments, the client device may maintain, in a memory of the client device, a queue representing asynchronous requests for web content, where the asynchronous requests correspond to asynchronous function calls defined by the script content. After transmitting the second message containing the representation of the second subset of the first plurality of asynchronous function calls and the second plurality of asynchronous function calls, the client device may receive results associated with the second subset of the first plurality of asynchronous function calls and the second plurality of asynchronous function calls. The client device may then determine that the queue is empty and that the web page has completed loading.

In some embodiments, the client device may maintain, in a memory of the client device, a queue representing asynchronous requests for web content, where the asynchronous requests correspond to asynchronous function calls defined by the script content. Prior to transmitting the first message containing the ordered representation of the first plurality of asynchronous function calls, the client device may detect a trigger event. In response to detecting the trigger event, and further in response to the first plurality of asynchronous function calls being all asynchronous function calls present in the queue when the trigger event is detected, the client device may transmit, to the web server device, the first message containing the ordered representation of the first plurality of asynchronous function calls.

The act of detecting the trigger event may involve detecting that a predetermined time period has expired, where the predetermined time period starts when the client device begins receiving the web document. Additionally or alternatively, detecting the trigger event may involve detecting that a number of asynchronous function calls read by the client device exceeds a predetermined threshold. Additionally or alternatively, detecting the trigger event may involve detecting that all of the first plurality of asynchronous function calls has been received.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
    receiving, by a web server device, a message containing a plurality of asynchronous requests for web content, wherein the plurality of asynchronous requests is received from a client device that was provided with a web document from which the web content is at least in part derivable;
    sorting, by the web server device, the plurality of asynchronous requests into an ordering based on respective estimated execution times of the plurality of asynchronous requests, wherein the ordering is from least estimated execution time to greatest estimated execution time;
    processing, by the web server device, the plurality of asynchronous requests as ordered until a predetermined amount of time measured from a beginning of the processing has expired; and
    transmitting, by the web server device and to the client device, results associated with one or more processed asynchronous requests of the plurality of asynchronous requests that were processed within the predetermined amount of time, wherein any remaining asynchronous requests not processed during the predetermined amount of time are processed during a subsequent predetermined amount of time.

2. The method of claim 1, comprising:
    prior to receiving the message containing the plurality of asynchronous requests, recording, in a memory of the web server device, an execution time for a past asynchronous request, wherein the execution time begins when the web server device began processing the past asynchronous request and ended when the web server device obtained a result associated with the past asynchronous request, and wherein the respective estimated execution times are based on the recorded execution time.

3. The method of claim 1, wherein an asynchronous request of the plurality of asynchronous requests comprises a type, the method comprising:
    maintaining, in a memory of the web server device, a history of execution times for past asynchronous requests of the type; and
    determining the respective estimated execution time for a subset of the plurality of asynchronous requests based on the history of execution times for past asynchronous requests of the type.

4. The method of claim 3, wherein the history includes an average execution time for the type of asynchronous request, and
    wherein determining the respective estimated execution time for a subset of the plurality of asynchronous request comprises determining the respective estimated execution time to be the average execution time for the type of asynchronous request.

5. The method of claim 4, comprising:
    measuring an execution time for the asynchronous request; and
    based on the measured execution time for the asynchronous request, determining an update to the average execution time for the type of asynchronous request.

6. The method of claim 1, wherein processing the plurality of asynchronous requests as ordered comprises:
    transmitting, by the web server device and to a database device, the message comprising the plurality of asynchronous requests as ordered; and
    receiving, by the web server device and from the database device, a response message comprising the results associated with the plurality of asynchronous requests.

7. The method of claim 1, wherein the message comprises a first message, and wherein the plurality of asynchronous requests comprises a first plurality of asynchronous requests, the method comprising:

receiving, from the client device, a second message containing a second plurality of asynchronous requests for web content.

8. The method of claim 7, wherein the second message comprises any remaining asynchronous requests not processed during the predetermined amount of time by the web server device.

9. A computing system comprising:

one or more processors;

memory storing web content; and program instructions, stored in the memory, that upon execution by the one or more processors cause the computing system to perform operations comprising:

receiving a message containing a plurality of asynchronous requests for the web content, wherein the plurality of asynchronous requests is received from a client device that was provided with a web document from which the web content is at least in part derivable;

sorting the plurality of asynchronous requests into an ordering based on respective estimated execution times of the plurality of asynchronous requests, wherein the ordering is from least estimated execution time to greatest estimated execution time;

processing the plurality of asynchronous requests as ordered until a predetermined amount of time measured from a beginning of the processing has expired; and transmitting, to the client device, results associated with one or more processed asynchronous requests of the plurality of asynchronous requests that were processed within the predetermined amount of time, wherein any remaining asynchronous requests not processed during the predetermined amount of time are processed during a subsequent predetermined amount of time.

10. The computing system of claim 9, the operations comprising:

prior to receiving the message containing the plurality of asynchronous requests, recording, in the memory, an execution time for a past asynchronous request, wherein the execution time begins when a web server device began processing the past asynchronous request and ended when the web server device obtained a result associated with the past asynchronous request, and wherein the respective estimated execution times are based on the recorded execution time.

11. The computing system of claim 9, wherein an asynchronous request of the plurality of asynchronous requests comprises a type, the operations further comprising:

maintaining, in the memory, a history of execution times for past asynchronous requests of the type; and determining the respective estimated execution time for a subset of the plurality of asynchronous requests based on the history of execution times for past asynchronous requests of the type.

12. The computing system of claim 9, wherein processing the plurality of asynchronous requests as ordered comprises:

transmitting, to a database device, the message comprising the plurality of asynchronous requests as ordered; and receiving, from the database device, a response message comprising the results associated with the plurality of asynchronous requests.

13. The computing system of claim 9, wherein the message comprises a first message, and wherein the plurality of asynchronous requests comprises a first plurality of asynchronous requests, the operations further comprising:

receiving, from the client device, a second message containing a second plurality of asynchronous requests for web content.

14. The computing system of claim 13, wherein the second message comprises any remaining asynchronous requests not processed during the predetermined amount of time by a web server device.

15. Non-transitory and computer-readable medium storing processor-executable instructions thereon that, when executed, cause a processor to:

receive a message containing a plurality of asynchronous requests for web content, wherein the plurality of asynchronous requests is received from a client device that was provided with a web document from which the web content is at least in part derivable;

sort the plurality of asynchronous requests into an ordering based on respective estimated execution times of the plurality of asynchronous requests, wherein the ordering is from least estimated execution time to greatest estimated execution time;

process the plurality of asynchronous requests as ordered until a predetermined amount of time measured from a beginning of the processing has expired; and transmit, to the client device, results associated with one or more processed asynchronous requests of the plurality of asynchronous requests that were processed within the predetermined amount of time, wherein any remaining asynchronous requests not processed during the predetermined amount of time are processed during a subsequent predetermined amount of time.

16. The non-transitory and computer-readable medium of claim 15, wherein the instructions cause the processor to prior to receiving the message containing the plurality of asynchronous requests, record an execution time for a past asynchronous request, wherein the execution time begins when a web server device began processing the past asynchronous request and ended when the web server device obtained a result associated with the past asynchronous request, and wherein the respective estimated execution times are based on the recorded execution time.

17. The non-transitory and computer-readable medium of claim 15, wherein an asynchronous request of the plurality of asynchronous requests comprises a type, wherein the instructions cause the processor to:

maintain a history of execution times for past asynchronous requests of the type; and determine the respective estimated execution time for a subset of the plurality of asynchronous requests based on the history of execution times for past asynchronous requests of the type.

18. The non-transitory and computer-readable medium of claim 15, wherein processing the plurality of asynchronous requests as ordered comprises:

transmitting, to a database device, the message comprising the plurality of asynchronous requests as ordered; and receiving, from the database device, a response message comprising the results associated with the plurality of asynchronous requests.

19. The non-transitory and computer-readable medium of claim 15, wherein the message comprises a first message, and wherein the plurality of asynchronous requests comprises a first plurality of asynchronous requests, wherein the instructions cause the processor to:
  receive, from the client device, a second message containing a second plurality of asynchronous requests for web content.

* * * * *